8104X
T. Spalding,
Steam-Boiler Indicator.
Patented Mar. 22, 1834.
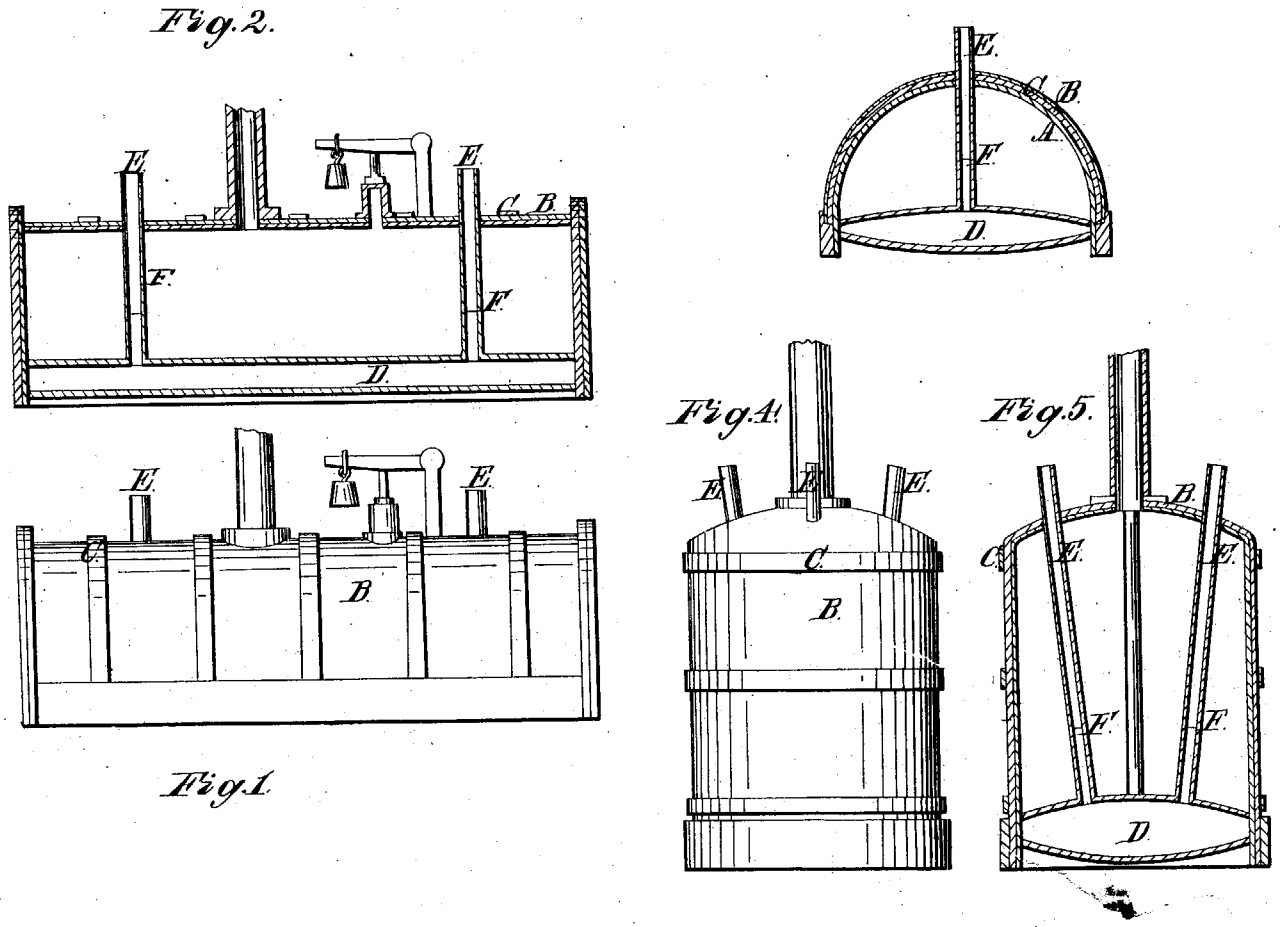
N. PETERS, PHOTO-LITHOGRAPHER, WASHINGTON, D. C.

Thomas Spalding. McIntosh. Co Georgia 8104X

Letters Patent.

The schedule referred to in these Letters Patent and making part of the same containing a description in the words of the said Thomas Spalding himself of his improvement in Generating Steam To all to whom these presents shall come: Be it known that I Thomas Spalding of the County of McIntosh and State of Georgia have invented a new and useful improvement in generating Steam and the following is a description of the construction of the Boiler as invented and improved by me The Boiler either round or long as may be desired or required and in external appearance will resembling any other Boiler now in common use. but the bottom will consist of two plates either Copper or iron as may be desired kept apart from each other by hoop of the same metal of which the plates of the bottom may be composed and the bottom may be made either of cast or wrought copper or iron at will — and around this bottom thus duplicate a strong iron hoop will pass and be secured to it in the strongest manner by screws equal to any pressure of Steam that may be required or desired The upper parts of the Boiler will be composed first of a casing in the common form of the Boilers of either Copper or iron or tinned iron or Cast iron or in fine of any metal which will contain water and be water tight at the necessary temperature for generating steam and over this will be laid hemp or flax or cloth made of hemp or flax or cotton or wool saturated with paste or glue animal or vegetable as many foldings of the cloth or the materials of which cloth is made as may give a perfect security against the possibility of bursting under any pressure that can be possibly required in any useful mechanic operation. for it was long since proven at Brest in a series of experiments made by men of science under the direction of the government of France that hemp kept together with glue was one third stronger than the swedish

8104X iron and twice as strong as a bar of English iron of the same size
over all these several envelops a light knit work of copper or iron as
well for ornament as to keep from injury the outer coating of the boiler
may be placed and which would show to the spectator any extraordi
nary pressure from within. From the upper plate of which the bot-
tom of the boiler is formed tubes of the same metal as numerous as
may be desired communicating with the space left open between the
two plates of which the bottom is composed pass up thro the water and
open into the air above & thro the top of the Boiler. The Boiler is
supplied with water and furnished with safty valves &c all other
apparatus necessary either for use or security. The intermediate space
between the two plates of the bottom is filled with tallow or any other
animal or vegetable oil or intermedium that is capable of readily recei-
ving and readily communicating to the water above it separated by the
upper plate and by the pipes from the water contained in the boiler but
imparting to it the high temperature which it is capable of recei-
ving — The tubes that pass from the intermedium thro the upper cov-
ering of the boiler will strengthen and preserve it from collapsing in
any neglect of the engineer. which the intermedium communicating
with the atmosphere if the water in the boiler should be from carelss-
ness allowed altogether to evaporate would then boil not until then
throw off its vapor and show by that is by the absence of steam that
there was no water remaining in the boiler. To take off the redundant
heat contained in the intermedium, tallow and other animal or
vegitable oils have been prefered because in giving out their vapour
in the absence of all water in the boiler above they would give an
admonitory sound sufficient to alarm any passenger in a Steam
Boat or other machine connected with it — It will be seen that
by this arrangement of tubes filled with tallow or other intermedium
all the power of Stephensons Tabular Boiler will be obtained without
their being subject to being destroyed by the passage of the flame thro
them — Witnesses Wm E Randall } Thomas Spalding
Peter Kemp } (743 words)

[illegible]